United States Patent
Kennie et al.

[11] Patent Number: 6,023,965
[45] Date of Patent: Feb. 15, 2000

[54] METHOD OF COMPENSATING FOR BOIL-OFF ALCOHOL IN A FLEXIBLE FUELED VEHICLE WITH A PCV SOLENOID

[75] Inventors: Jerry Kennie, Canton; Yi Cheng, Jackson; Robert J. Nankee, II, Canton, all of Mich.

[73] Assignee: Chrysler Corporation, Auburn Hills, Mich.

[21] Appl. No.: 08/959,817

[22] Filed: Oct. 29, 1997

[51] Int. Cl.[7] .................................................. G01M 15/00
[52] U.S. Cl. ........................................................ 73/118.1
[58] Field of Search ..................................... 73/35.02, 116, 73/117.2, 117.3, 118.1

[56] References Cited

U.S. PATENT DOCUMENTS

| | | |
|---|---|---|
| 5,255,661 | 10/1993 | Nankee, II et al. . |
| 5,335,637 | 8/1994 | Davis et al. . |
| 5,365,917 | 11/1994 | Adams et al. . |
| 5,400,762 | 3/1995 | Fodale et al. . |
| 5,415,145 | 5/1995 | Letcher et al. . |
| 5,435,285 | 7/1995 | Adams et al. . |
| 5,467,755 | 11/1995 | Konrad et al. . |
| 5,497,753 | 3/1996 | Kopera . |
| 5,520,162 | 5/1996 | Rotramel et al. . |
| 5,881,703 | 3/1999 | Nankee, II et al. ..................... 123/686 |
| 5,915,342 | 6/1999 | Huff et al. .............................. 123/686 |

*Primary Examiner*—Eric S. McCall
*Attorney, Agent, or Firm*—Mark P. Calcaterra

[57] ABSTRACT

The present invention provides a method of compensating for a boil-off condition in a flexible fuel compensation control system for a flexible fueled vehicle with a PCV solenoid. The methodology determines both the presence and extent of boil-off corruption and handles closed loop controls normally as if no boil-off corruption exists. The methodology also determines the amount of boil-off corruption being introduced through the PCV system and updates the flexible fueled vehicle fueling during a blend change between ethanol and gasoline. Additionally, the methodology determines when boil-off corruption is no longer influencing closed loop fuel control.

6 Claims, 2 Drawing Sheets

METHOD OF COMPENSATING FOR BOIL-OFF ALCOHOL IN A FLEXIBLE FUELED VEHICLE WITH A PCV SOLENOID

BACKGROUND OF THE INVENTION

1. Technical Field

The present invention relates generally to fuel control and, more particularly, to a method of measuring and compensating for a boil-off condition in a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being burned in proportion to the amount of air to achieve perfect combustion. Likewise, if the air/fuel ratio is greater than stoichiometric, an engine is said to be operating lean, i.e., too much air is being burned in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

In cold ambient temperatures, e.g., less than or equal to 35° F., fuel requirements for engine start-up are increased dramatically over gasoline with the use of ethanol as a fuel. During vehicle start and run-up with an ethanol content from E40 (40% ethanol and 60% to gasoline) to E85 (85% ethanol and 15% gasoline), excess fuel may enter the crank case by traveling down the cylinder walls. The excess fuel commingles with the engine oil and is vaporized when the engine oil reaches the evaporation temperature for ethanol (approximately 170° F.). The vaporized fuel then re-enters the engine induction system either through a PCV system or a PCV make-up system (i.e., crank case fresh air). Prior art systems directed toward compensating for methanol boil-off are ill-suited for ethanol fuel since ethanol boil-off corruption occurs almost immediately and does not slowly percolate as does methanol when engine oil reaches vaporization temperatures.

Therefore, it would be desirable to provide a method for measuring and compensating for excessive fuel vapor during boil-off corruption so that normal closed loop fueling adjustments may occur with minimal corruption, normal gasoline features may be unaffected by boil-off during blend changes from ethanol fuel to gasoline, and drivability may remain at target levels.

SUMMARY OF THE INVENTION

It is, therefore, one object of the present invention to provide a system of flexible fuel compensation.

It is another object of the present invention to provide a flexible fuel compensation system which detects the presence of boil-off corruption.

It is yet another object of the present invention to provide a flexible fuel compensation system which manages closed loop controls as if no boil-off corruption exists.

It is still another object of the present invention to provide a flexible fuel compensation system that minimizes the effect of boil-off corruption on learned fuel values during a fuel blend change.

It is still yet another object of the present invention to provide a flexible fuel compensation system that determines the amount of boil-off corruption being introduced through the PCV system at different airflows in the induction system.

It is a further object of the present invention to provide a flexible fuel compensation system that determines when boil-off corruption is no longer influencing closed loop fuel control.

The above and other objects are provided by a method for compensating for boil-off alcohol in a flexible fueled vehicle using a PCV solenoid. The methodology determines both the presence and extent of boil-off corruption and handles closed loop controls normally as if no boil-off corruption exists. The methodology also determines the amount of boil-off corruption being introduced through the PCV system given different airflows in the PCV/induction system and adjusts operating parameters accordingly. Additionally, the methodology updates fueling during a blend change between ethanol and gasoline to minimize drivability problems and determines when the boil-off condition is no longer influencing closed loop control.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
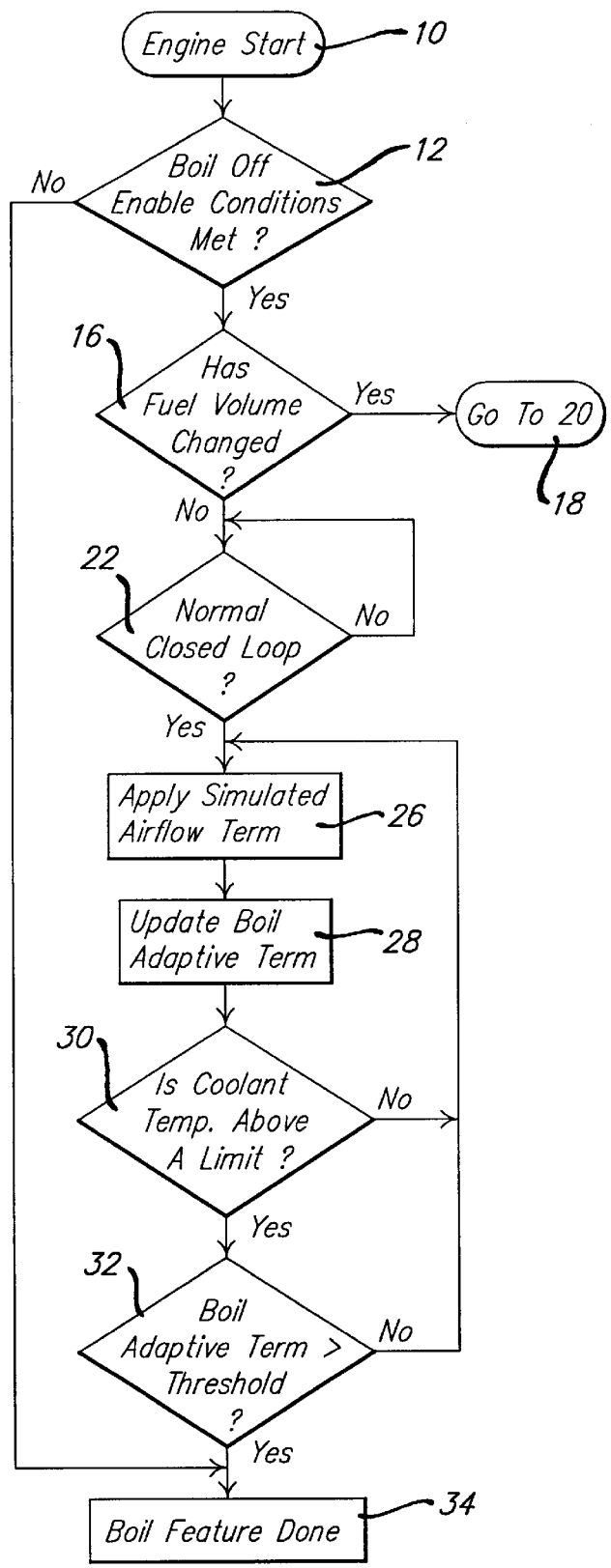
FIG. 1 is a flow chart of a method of flexible fuel compensation control for a flexible fueled vehicle during a boil-off condition with a PCV shut-off solenoid.

The present invention is directed towards a method of compensating for a boil-off condition in a flexible fueled vehicle having a PCV solenoid. The present invention determines if a boil-off condition is occurring and allows for normal closed loop fuel routines to be employed. For the purposes of this specification, closed loop refers to that state of engine operation wherein feedback and fuel content changes are based on a functioning, accurate oxygen sensor. The methodology also updates ethanol/gasoline fuel routines during a blend change from one fuel to another and determines when the boil-off condition is no longer influencing operation. Although the present invention is well suited for use with a number of fuel control systems, a preferred fuel control system is disclosed in U.S. Pat. No. 5,881,703 entitled "Method Of Determining A Composition Of Fuel In A Flexible Fueled Vehicle" to Nankee II et al. which is expressly incorporated by reference herein.

In cold ambient temperatures, engine start fuel requirements are increased dramatically over gasoline with the use of ethanol as a fuel. During vehicle start/run-up with ethanol, excess fuel may enter the crank case via "cylinder wash-down." This excess fuel is then vaporized and re-enters the induction system as boil-off either through the PCV system or PCV make-up system.

According to the present invention, a cycled PCV shut-off solenoid is used as a tool for measuring the amount of boil-off corruption through the PCV system. If the boil-off feature is triggered, the PCV system cycles on and off at timed intervals. As the PCV system is turned off, boil-off corruption (i.e., crank case vapor) is temporarily blocked from the induction system. Therefore, the closed loop controls reflect the approximate fuel requirements of the engine.

When the PCV system is turned on, boil-off corruption (i.e., crank case vapor) is introduced into the induction system. Therefore, the closed loop controls reflect a change in the requirements of the engine. Based upon this change of closed loop control between the PCV system off and on states, the amount of boil-off corruption is realized.

The change in closed loop control between PCV system off and on states is then equated to a boil-off adaptive factor. The boil-off adaptive factor is used in a pulse width equation for correcting fueling parameters for the duration of the boil-off condition. Once set, the boil-off feature continuously checks and compensates for PCV corruption until the change in closed loop control between PCV off and on states is less than 10%. At this time, the boil-off feature is turned off.

The intensity of boil-off corruption changes as flow rates change through the PCV system. In order to compensate for the different intensities, a simulated airflow equation is used to compensate for the amount of boil-off corruption being introduced into the induction system versus PCV flow rate. At low induction PCV flow rates, the boil-off corruption introduced through the PCV system is much less than at higher PCV flow rates. This flow variation is also equated into the boil-off adaptive factor used in the pulse width equation.

When boil-off is occurring during a blend change from gasoline to ethanol or from ethanol to gasoline, ethanol fueling controls are only updated during the time the PCV system is turned off. This allows minimal boil-off corruption to influence the update of ethanol or gasoline fuel control values. Furthermore, the boil-off feature is triggered when the ethanol content in the fuel system is greater than E50 (50% ethanol and 50% gasoline), both ambient and coolant temperature are less than 35° F., and engine cylinder events until start are greater than two.

Turning now to the drawing figures, FIG. 1 illustrates a flow chart for a method of flexible fuel compensation control during a boil-off condition with a PCV shutoff solenoid in the absence of a fuel blend change. The methodology starts in bubble 10 at engine start-up and advances to decision block 12. In decision block 12, the methodology determines if the boil-off enable conditions are met. For instance, the methodology determines if starting ethanol content is greater than E50, both ambient and coolant temperatures are less than 35° F., and engine cylinder events until start are greater than 2. If the boil-off enable conditions are not met, the methodology advances to bubble 14 and returns to start-up bubble 10.

Figure 2:
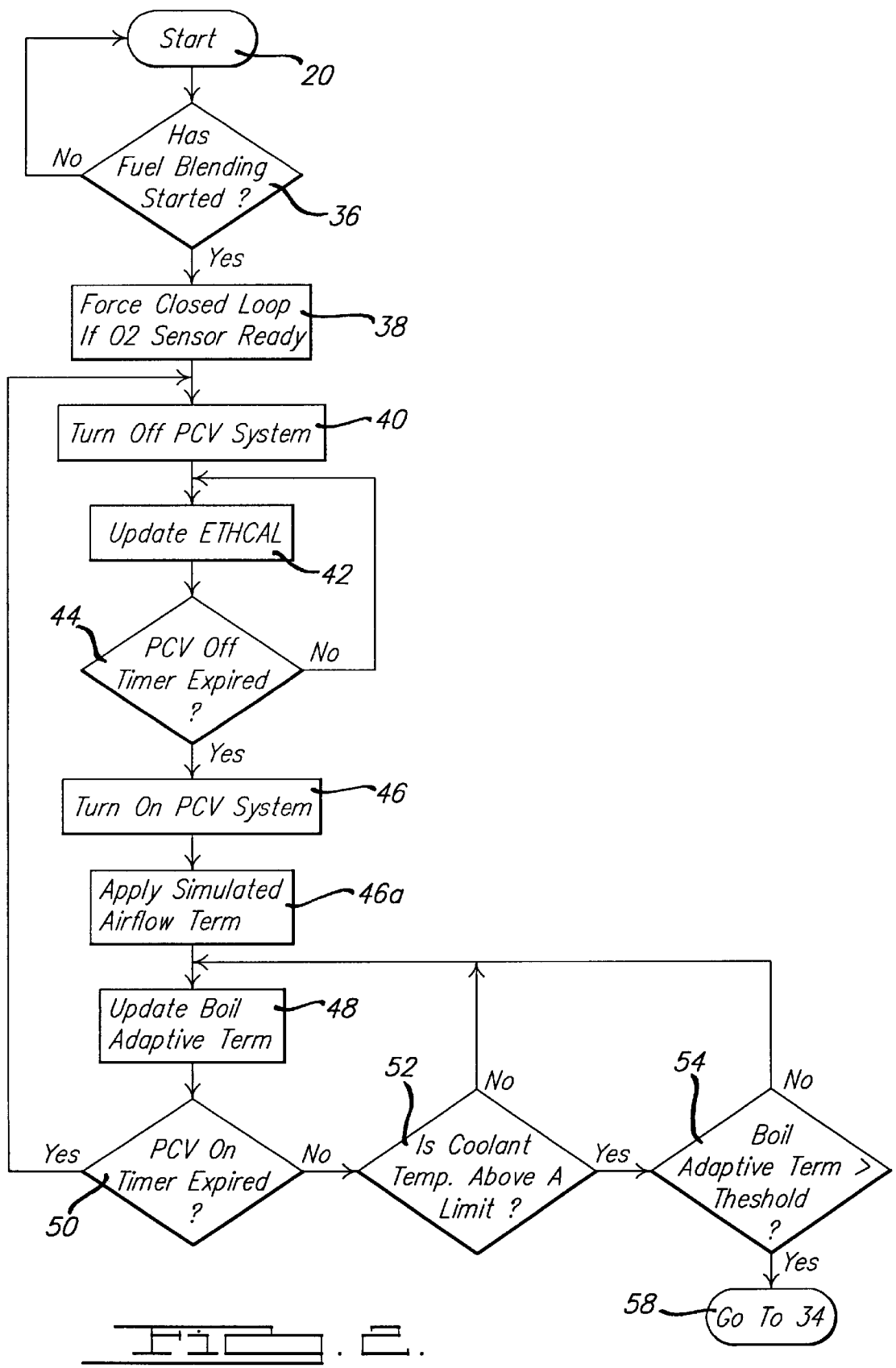
FIG. 2 is a flow chart of a method of flexible fuel compensation control for a flexible fueled vehicle during a boil-off condition with a PCV shutoff solenoid during a fuel blend change.

If the boil-off enable conditions are met at decision block 12, the methodology advances to decision block 16. In decision block 16, the methodology determines if a volume of fuel in the fuel tank has changed. This can be determined by a conventional fuel level sensor. If so, the methodology advances to bubble 18 where it is forwarded to bubble 20 (FIG. 2). If the fuel volume has not changed at decision block 16, the methodology advances to decision block 22.

In decision block 22, the methodology determines if the fuel control system is operating in a normal closed loop mode. If not, the methodology delays advancement by remaining in decision block 22 until a normal closed loop mode is reached. When the methodology determines that the fuel control system is operating in a normal closed loop mode at decision block 22, the methodology advances to block 26.

In block 26, a simulated airflow term is applied to the boil-off adaptive term and the resulting adaptive factor is used in the fuel equation. After applying the simulated airflow term in block 26, the methodology advances to block 28 and updates the boil-off adaptive term. From block 28 the methodology advances to decision block 30.

In decision block 30, the methodology determines if the coolant temperature is above a pre-selected threshold such as 170° F. If so, the methodology advances to decision block 32 and determines if the boil-off adaptive term is greater than a given threshold. If not, the methodology returns to block 26. However, if the boil-off adaptive term is greater than the threshold value at decision block 32, and if the coolant temperature is above the pre-selected threshold at decision block 30, the methodology advances to block 34.

Referring now to FIG. 2, a flow chart of a boil-off feature for a flexible fuel compensation control is illustrated for use with a PCV shutoff solenoid during a fuel blend change period in a flexible fueled vehicle. The methodology starts in bubble 20 and advances to decision block 36. In decision block 36, the methodology determines if fuel blending has started. This can be determined by a timer. If not, the methodology returns to start-up bubble 20. If fuel blending has started at decision block 36, the methodology advances to block 38.

In block 38, the methodology forces operation of the fuel control system to a closed loop mode if the oxygen sensor is ready. The readiness of the oxygen sensor may be determined by a counter. From block 38 the methodology advances to block 40 and turns off the PCV system. After turning off the PCV system, the methodology advances to block 42 and updates the inferred alcohol content value.

After updating the inferred alcohol content value at block 42, the methodology advances to decision block 44. In decision block 44, the methodology determines if a PCV-off timer has expired. If not, the methodology returns to block 42. If the PCV-off timer has expired at decision block 44, the methodology advances to block 46.

In block 46 the methodology turns on the PCV system. After turning on the PCV system, the methodology advances to block 46A and applies a simulated air flow term to the boil-off adaptive term, and the resulting adaptive factor is used in the fuel equation. From block 46A, the methodology advances to block 48 and updates the boil-off adaptive term. From block 48, the methodology advances to decision block 50.

In decision block 50, the methodology determines if the PCV-on timer has expired. If so, the methodology returns to block 40 and turns off the PCV system. If the PCV-on timer has not expired at decision block 50, the methodology advances to decision block 52.

In decision block 52, the methodology determines if the coolant temperature is above a given threshold such as 170° F. If so, the methodology advances to decision block 54. In decision block 54, the methodology determines if the boil-off adaptive term is greater than a threshold. If either thresholds in blocks 52 or 54 are not met, the methodology returns to block 48. If both thresholds in blocks 52 and 54 are met, the methodology advances to block 58. In block 58, the methodology returns to block 34 (FIG. 1) and the feature is complete.

According to the above, the present invention provides a method of compensating for a boil-off condition in a flexible fuel compensation control system for a flexible fueled vehicle with a PCV solenoid. The methodology determines both the presence and extent of boil-off corruption and handles closed loop controls normally as if no boil-off corruption exists. The methodology also determines the amount of boil-off corruption being introduced through the PCV system and updates the flexible fuel vehicle fueling during a fuel blend change. Additionally, the methodology determines when boil-off corruption is no longer influencing closed loop fuel control.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of compensating for a boil-off condition in a flexible fuel control system of a flexible fueled vehicle comprising:

detecting the presence of a boil-off condition;

cycling a PCV system between an on state and an off state at timed intervals;

determining a level of boil-off corruption based on a difference between closed loop control during said PCV system on state and closed loop control during said PCV system off state;

setting fueling parameters for said flexible fueled vehicle in said flexible fuel control system according to said level of boil-off corruption; and compensating for said boil-off condition until said difference in said closed loop control for said PCV on state and said closed loop control for said PCV off state is less than about 10%.

2. The method of claim 1 further comprising:

determining a boil-off adaptive factor according to said difference between said closed loop control for said PCV on state and said closed loop control for said PCV off state; and applying said boil-off adaptive factor to a fueling strategy for setting said fueling parameters for said flexible fueled vehicle for a duration of said boil-off condition.

3. The method of claim 2 further comprising:

determining a flow rate through said PCV system; and compensating for an amount of boil-off corruption being introduced into said PCV system according to said flow rate through said PCV system.

4. The method of claim 3 further comprising incorporating said flow rate through said PCV system into said boil-off adaptive factor.

5. A method of compensating for boil-off condition in a flexible fuel control system of a flexible fueled vehicle comprising:

detecting the presence of a boil-off condition;

cycling a PCV system between an on state and an off state at timed intervals;

determining a level of boil-off corruption based on a difference between closed loop control during said PCV system on state and closed loop control during said PCV system off state;

setting fueling parameters for said flexible fueled vehicle in said flexible fuel control system according to said level of boil-off corruption;

detecting a fuel blend change between ethanol and gasoline in a fuel system of said flexible fueled vehicle; and updating said fuel parameters when said PCV system is in said off state during said blend change.

6. A method of compensating for a boil-off condition in a flexible fuel control system of a flexible fueled vehicle comprising:

detecting the presence of a boil-off condition;

cycling a PCV system between an on state and an off state at timed intervals;

determining a level of boil-off corruption based on a difference between closed loop control during said PCV system on state and closed loop control during said PCV system off state;

setting fueling parameters for said flexible fueled vehicle in said flexible fuel control system according to said level of boil-off corruption; and starting said cycling of said PCV system between said on state and said off state when an ethanol content in a fuel system of said flexible fueled vehicle is greater than 50% ethanol, both ambient and coolant temperatures are less than 35° F., and engine cylinder events until start are greater than two.

* * * * *